US010149288B2

(12) United States Patent
Kim et al.

(10) Patent No.: US 10,149,288 B2
(45) Date of Patent: Dec. 4, 2018

(54) METHOD AND DEVICE FOR RECEIVING OR TRANSMITTING DOWNLINK DATA IN WIRELESS COMMUNICATION SYSTEM

(71) Applicant: LG Electronics Inc., Seoul (KR)

(72) Inventors: Eunsun Kim, Anyang-si (KR); Byounghoon Kim, Anyang-si (KR); Kijun Kim, Anyang-si (KR)

(73) Assignee: LG Electronics, Seoul (KR)

( * ) Notice: Subject to any disclaimer, the term of this patent is extended or adjusted under 35 U.S.C. 154(b) by 139 days.

(21) Appl. No.: 14/436,798

(22) PCT Filed: Aug. 13, 2013

(86) PCT No.: PCT/KR2013/007273
§ 371 (c)(1),
(2) Date: Apr. 17, 2015

(87) PCT Pub. No.: WO2014/073776
PCT Pub. Date: May 15, 2014

(65) Prior Publication Data
US 2015/0264669 A1    Sep. 17, 2015

Related U.S. Application Data

(60) Provisional application No. 61/723,752, filed on Nov. 7, 2012.

(51) Int. Cl.
*H04W 72/04*    (2009.01)
*H04L 5/00*    (2006.01)
(Continued)

(52) U.S. Cl.
CPC ......... *H04W 72/042* (2013.01); *H04L 5/0048* (2013.01); *H04L 5/0091* (2013.01);
(Continued)

(58) Field of Classification Search
CPC ............... H04W 72/042; H04W 72/12; H04W 72/1263; H04W 72/1278; H04W 72/1289;
(Continued)

(56) References Cited

U.S. PATENT DOCUMENTS

| 2013/0010707 A1* | 1/2013 | Gaal ....................... H04L 5/003 370/329 |
| 2013/0114483 A1* | 5/2013 | Suzuki ................ H04W 76/048 370/311 |
| 2013/0203450 A1* | 8/2013 | Mochizuki ............ H04W 68/02 455/458 |

FOREIGN PATENT DOCUMENTS

| JP | WO 2012043524 A1 * | 4/2012 | ............ H04W 68/02 |
| WO | 2012094215 | 7/2012 | |

OTHER PUBLICATIONS

Alcatel-Lucent Shanghai Bell et al., "CSI-RS transmissions in subframes used for paging," R2-123912, 3GPP TSG-RAN WG2 #79 meeting, Qingdao, China, Aug. 13-17, 2012, see pp. 1, 2.
(Continued)

*Primary Examiner* — Ricky Q Ngo
*Assistant Examiner* — Stephen N Steiner
(74) *Attorney, Agent, or Firm* — Dentons US LLP

(57) ABSTRACT

A method of receiving downlink data in a wireless communication system according to an embodiment of the present invention includes: receiving a first parameter, for determining the effectiveness of a channel state information-reference signal (CSI-RS) from a special cell, from a first cell; and obtaining information on a sub frame having non-effective CSI-RS by using the number of sub frames to which the paging message of a second cell is transmitted for a reference time, and the first parameter may be different from a second parameter that is transmitted by the second
(Continued)

cell and indicates the number of sub frames to which the paging message of the second cell is transmitted for the reference time.

12 Claims, 6 Drawing Sheets

(51) Int. Cl.
*H04W 68/00* (2009.01)
*H04W 76/28* (2018.01)

(52) U.S. Cl.
CPC ............ *H04L 5/001* (2013.01); *H04L 5/0035* (2013.01); *H04W 68/005* (2013.01); *H04W 76/28* (2018.02)

(58) Field of Classification Search
CPC . H04W 68/005; H04W 68/02; H04W 68/025; H04W 76/048; H04L 5/0048; H04L 5/0091; H04L 5/001; H04L 5/0035
See application file for complete search history.

(56) References Cited

OTHER PUBLICATIONS

Ericsson et al., "Interpretation of CSI-RS transmissions in subframes used for paging," R1-122832, 3GPP TSG-RAN WG1 #69, Prague, Czech Republic, May 21-30, 2012, see pp. 1, 2.
Huawei et al., "Discussion on avoidance of collisions between CSI-RS and paging subframes on Scell," R1-124065, 3GPP TSG-RAN WG1 Meeting #70bis, San Diego, USA, Oct. 8-12, 2012, see pp. 1, 2.
Nokia et al., "Paging and CSI-RS," R1-124515, 3GPP TSG-RAN WG1 Meeting #70bis, San Diego, USA, Oct. 8-12, 2012, see pp. 1, 2.

* cited by examiner

METHOD AND DEVICE FOR RECEIVING OR TRANSMITTING DOWNLINK DATA IN WIRELESS COMMUNICATION SYSTEM

This application is a 35 USC § 371 National Stage entry of International Application No. PCT/KR2013/007273 filed on Aug. 13, 2013, and claims priority to U.S. Provisional Application No. 61/723,752 filed on Nov. 7, 2012, all of which are hereby incorporated by reference in their entireties as if fully set forth herein.

TECHNICAL FIELD

The present invention relates to a method for receiving or transmitting downlink data in a wireless communication system and a device for the same.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system.

Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide a method for receiving or transmitting downlink data in a wireless communication system and a device for the same.

Another object of the present invention is to provide a method for determining effectiveness of a channel state information-reference signal (CSI-RS) within a downlink subframe of a special cell on the basis of a special parameter in a wireless communication system.

The technical objects that can be achieved through the present invention are not limited to what has been particularly described hereinabove and other technical objects not described herein will be more clearly understood by persons skilled in the art from the following detailed description.

Technical Solution

According to one embodiment of the present invention, a method for receiving downlink data in a wireless communication system comprises receiving a first parameter for determining validity of a channel state information-reference signal (CSI-RS) which is transmitted from a specific cell, from a first cell; and acquiring information on a subframe in which the CSI-RS is not valid by using the first parameter and demodulating the downlink data based on the acquired information on the subframe, wherein the first parameter indicates the number of subframes in which a paging message of a second cell is transmitted for a reference time, and the first parameter is different from a second parameter, that is transmitted by the second cell, indicating the number of subframes in which the paging message of the second cell is transmitted for the reference time.

Preferably, the paging message of the second cell may include a paging message of a secondary cell (Scell) or non-serving cell.

Preferably, the first parameter may be a value greater than the second parameter.

Preferably, the first parameter may be a value smaller than the second parameter.

Preferably, the reference time may correspond to a discontinuous reception (DRX) cycle.

Preferably, the method may include the downlink data is demodulated on assumption that the downlink data is mapped into a resource location of a channel state information-reference signal of the second cell in the subframe.

Preferably, the subframe in which the paging message is transmitted is determined as a subframe in which the CSI-RS is not valid.

According to another embodiment of the present invention, a method for transmitting downlink data in a wireless communication system is performed by a first cell and comprises transmitting a first parameter for determining validity of a channel state information-reference signal (CSI-RS) which is transmitted from a second cell, to a user equipment, wherein the first parameter is used to acquire information on a subframe in which the CSI-RS is not valid, and the first parameter indicates the number of subframes in which a paging message of the second cell is transmitted for a reference time, and is different from a second parameter, that is transmitted by the second cell, indicating the number of subframes in which the paging message of the second cell is transmitted for the reference time.

Preferably, the paging message of the second cell may include a paging message of a secondary cell (Scell) or non-serving cell.

Preferably, the first parameter may be a value greater than the second parameter.

Preferably, the first parameter may be a value smaller than the second parameter.

Preferably, the reference time may correspond to a discontinuous reception (DRX) cycle.

Preferably, the method may further comprise assuming that the downlink data is mapped into a resource location of a channel state information-reference signal of the second cell in the subframe.

Preferably, the subframe in which the paging message is transmitted may be determined as a subframe in which the CSI-RS is not valid.

According to still another embodiment of the present invention, a user equipment configured to receive downlink data in a wireless communication system comprises a radio frequency (RF) unit; and a processor configured to control the RF unit, wherein the processor is configured to receive a first parameter for determining validity of a channel state information-reference signal (CSI-RS) from a specific cell, from a first cell, acquire information on a subframe in which the CSI-RS is not valid by using the first parameter and demodulate the downlink data based on the acquired information on the subframe, and the first parameter indicates the number of subframes in which a paging message of a second cell is transmitted for a reference time, and is different from a second parameter, that is transmitted by the second cell, indicating the number of subframes in which the paging message of the second cell is transmitted for the reference time.

According to further still another embodiment of the present invention, a base station equipment configured to transmit downlink data in a wireless communication system comprises a radio frequency (RF) unit; and a processor configured to control the RF unit, wherein the processor is configured to transmit a first parameter for determining validity of a channel state information-reference signal (CSI-RS) which is transmitted from a second cell, to a user equipment, and the first parameter is used to acquire information on a subframe in which the CSI-RS is not valid, and the first parameter indicates the number of subframes in which a paging message of the second cell is transmitted for a reference time, and is different from a second parameter, that is transmitted by the second cell, indicating the number of subframes in which the paging message of the second cell is transmitted for the reference time.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the embodiment(s) of the present invention, demodulation throughput of downlink data is improved.

Also, according to the embodiment(s) of the present invention, resources for downlink data may be allocated efficiently.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
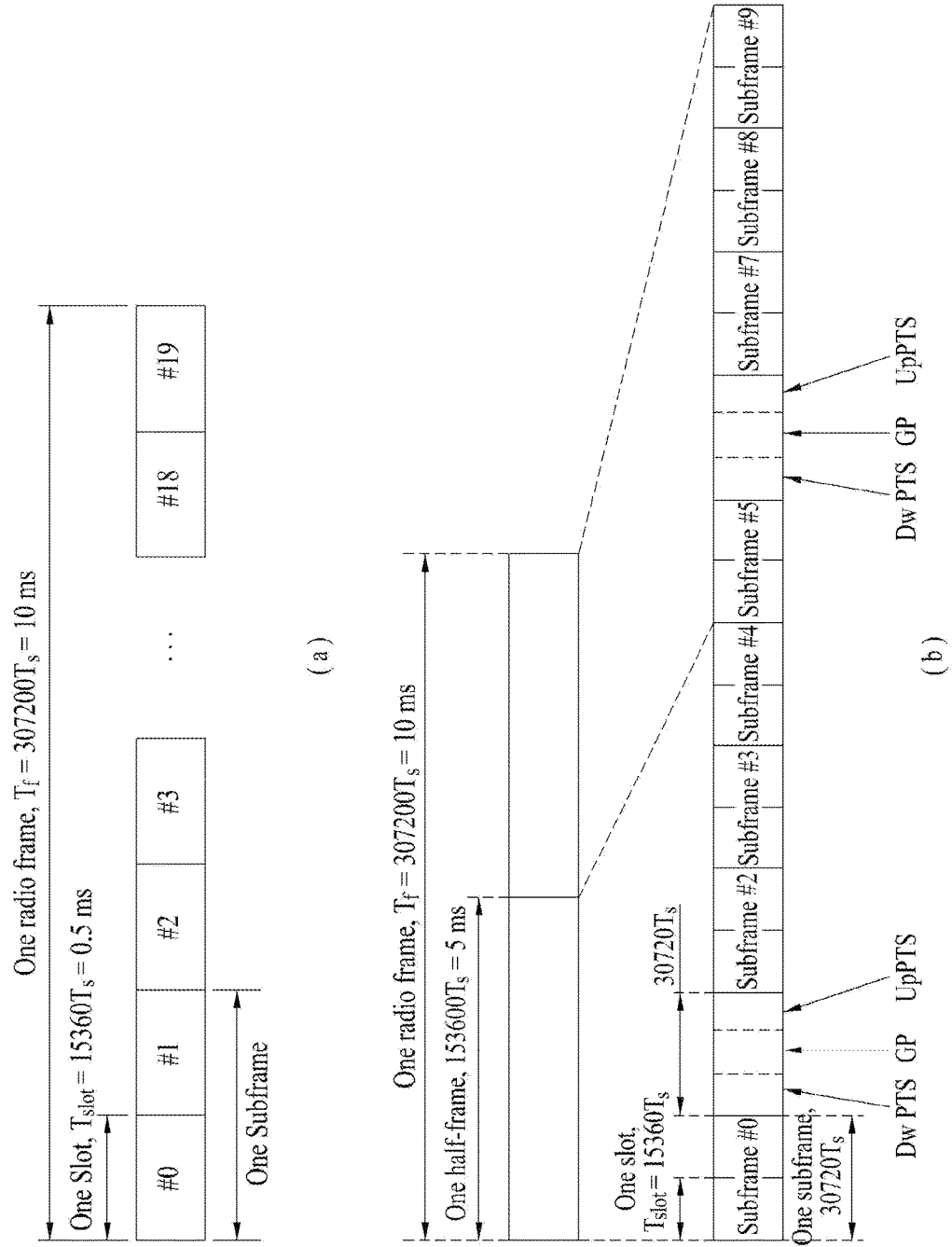
FIGS. 1(a) and 1(b) are diagrams illustrating an example of a structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

Also, technique, device, system, which will be described hereinafter, may be applied to various wireless multiplexing access systems. For convenience of description, it is assumed that the present invention is applied to a 3GPP LTE(-A). However, it is to be understood that technical features of the present invention are limited to the 3GPP LTE(-A). For example, although the following description will be made based on a mobile communication system corresponding to a 3GPP LTE(-A) system, the following description may be applied to other random mobile communication system except matters specific to the 3GPP LTE(-A).

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

Also, in the present invention, Cell-specific Reference Signal (CRS)/Demodulation Reference Signal (DMRS)/Channel State Information Reference Signal (CSI-RS) time-frequency resources (or REs) respectively mean REs that may be allocated or used for CRS/DMRS/CSI-RS, or time-frequency resources (or REs) carrying CRS/DMRS/CSI-RS. Also, subcarriers that include CRS/DMRS/CSI-RS RE may be referred to as CRS/DMRS/CSI-RS subcarriers, and OFDM symbols that include CRS/DMRS/CSI-RS RE may be referred to as CRS/DMRS/CSI-RS symbols. Also, in the present invention, SRS time-frequency resources (or REs) may mean time-frequency resources (or REs) transmitted from the user equipment to the base station to allow the base station to carry a sounding reference signal (SRS) used for measurement of an uplink channel status formed between the user equipment and the base station. The reference signal (RS) means a signal of a special waveform previously defined and known well by the user equipment and the base station, and may be referred to as a pilot.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
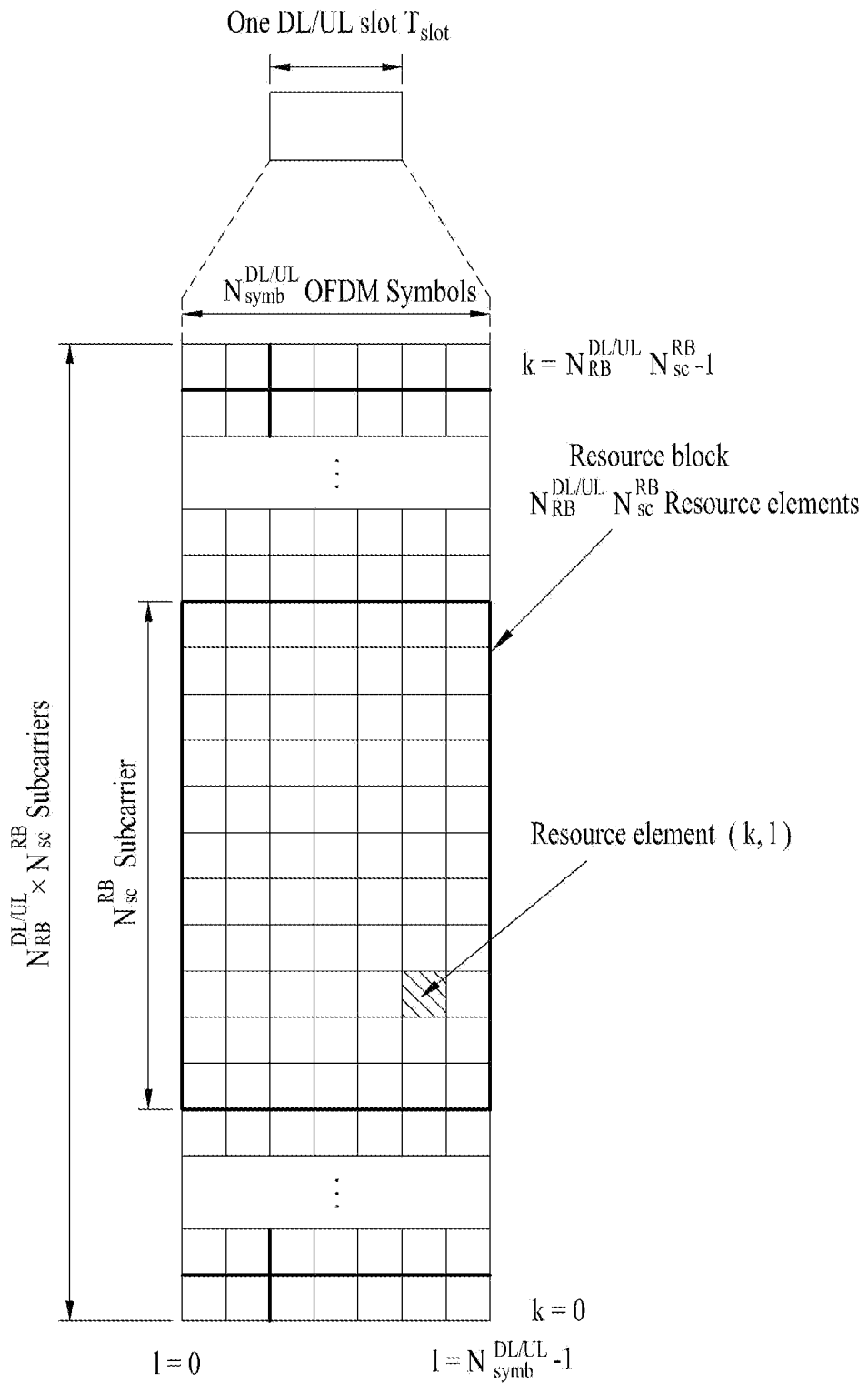
FIG. 2 is a diagram illustrating an example of a structure of a downlink (DL)/uplink (UL) slot in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
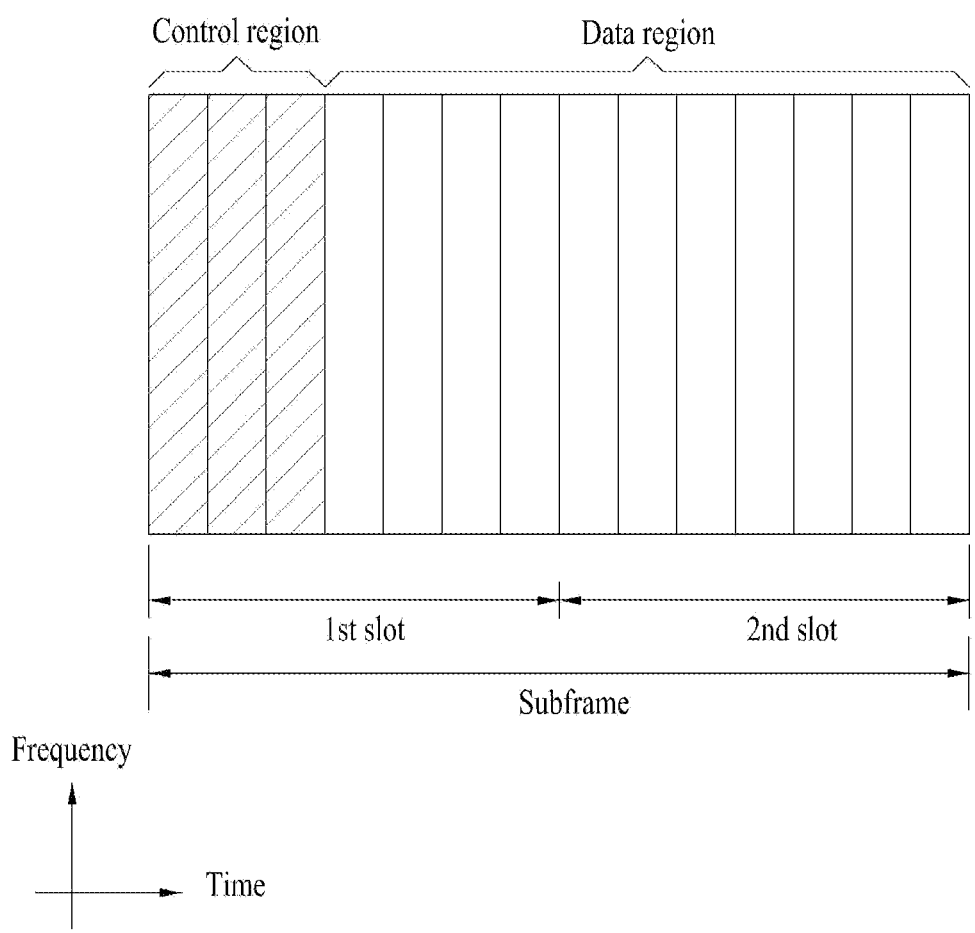
FIG. 3 is a diagram illustrating a structure of a DL subframe used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
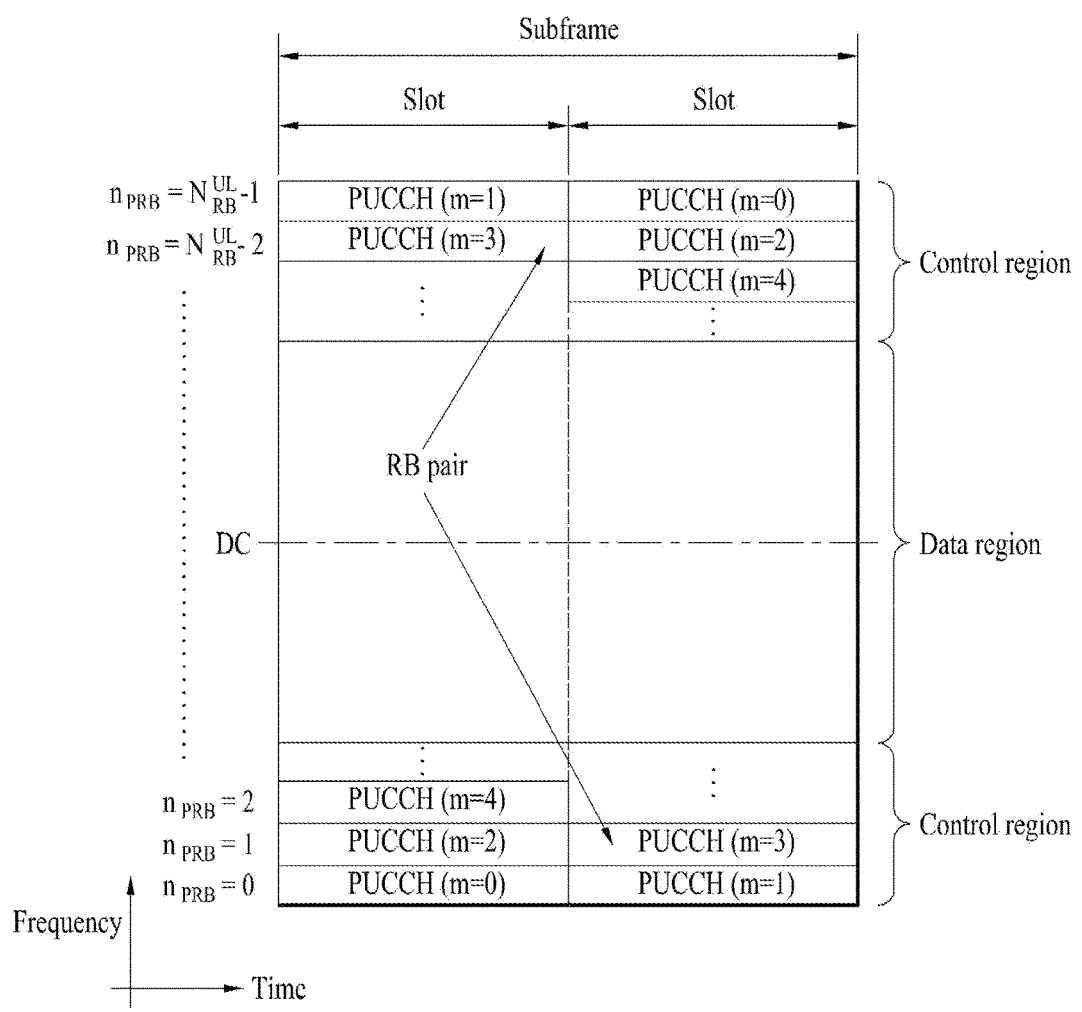
FIG. 4 is a diagram illustrating a structure of a UL subframe used in a 3GPP LTE/LTE-A system.

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency f0 in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
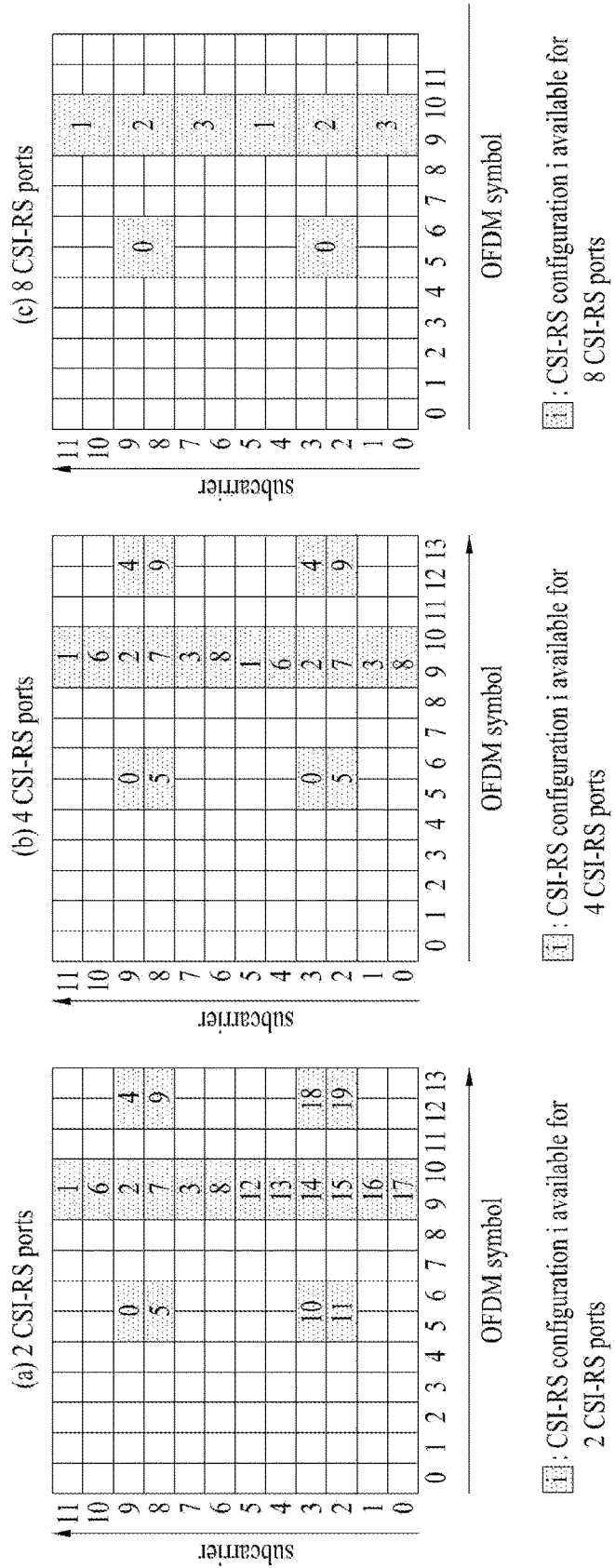
FIGS. 5(a), 5(b) and 5(c) are diagrams illustrating a CSI-RS mapping pattern according to antenna ports.

FIG. 5 illustrates CSI-RS mapping patterns according to antenna ports. An antenna port for CSI-RS transmission is referred to as a CSI-RS port and positions of resources in a predetermined resource region, in which CSI-RSs are transmitted through CSI-RS ports corresponding thereto, are referred to as a CSI-RS pattern or CSI-RS resource configuration. In addition, a time-frequency resource to/through which a CSI-RS is allocated/transmitted is referred to as a CSI-RS resource. For example, a resource element (RE) used for CSI-RS transmission is referred to as a CSI-RS RE. While the position of an RE through which a CRS is transmitted per antenna port is fixed, the CSI-RS has a maximum of 32 different configurations in order to reduce inter-cell interference (ICI) in a multi-cell environment including a heterogeneous network environment. A CSI-RS configuration depends on the number of antenna ports in a cell and CSI-RS configurations are set such that neighboring cells have different configurations. The CSI-RS supports up to 8 antenna ports (p=15, p=15, 16, p=15, . . . , 18 and p=15, . . . , 22), distinguished from the CRS, and is defined for $\Delta f=15$ kHz only. Antenna ports p=15, . . . , 22 may respectively correspond to CSI-RS ports p=0, . . . , 7 in the following description.

Tables 3 and 4 show CSI-RS configurations that can be used in a frame structure (referred to as FS-1 hereinafter) for FDD (frequency division duplex) and a frame structure (referred to as FS-2 hereinafter) for TDD (time division duplex). Particularly, Table 3 shows CSI-RS configurations in a subframe having the normal CP and Table 4 shows CSI-RS configurations in a subframe having the extended CP.

TABLE 3

| | CSI-RS configuration | Number of CSI-RSs configured | | | | | |
|---|---|---|---|---|---|---|---|
| | | 1 or 2 | | 4 | | 8 | |
| | | (k', l') | $n_s$mod2 | (k', l') | $n_s$mod2 | (k', l') | $n_s$mod2 |
| FS-1 and FS-2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FS-2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 4

| | | Number of CSI-RSs configured | | | | | |
|---|---|---|---|---|---|---|---|
| | CSI-RS | 1 or 2 | | 4 | | 8 | |
| | configuration | (k', l') | $n_s$mod2 | (k', l') | $n_s$mod2 | (k', l') | $n_s$mod2 |
| FS-1 and FS-2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| FS-2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

When (k', l') (k' being a subcarrier index in a resource block and l' being an OFDM symbol index in a slot) in Tables 3 and 4 and $n_s$ ($n_s$ being a slot index in a frame) are applied to the following equation, a time-frequency resource used by each CSI-RS port to transmit a corresponding CSI-RS can be determined. That is, a CSI-RS sequence may be mapped to complex-valued modulation symbols used as reference symbols for CSI-RS port p in slot $n_s$ in a subframe (CSI-RS subframe) configured for CSI-RS transmission according to the following equation.

$$a_{k,l}^{(p)} = w_{l''} \cdot r_{l,n_s}(m') \quad \text{[Equation 1]}$$

In Equation 1, a resource index pair (k, l) (k being a subcarrier index and l being an OFDM symbol index in a subframe) used for CSI-RS port p for CSI-RS transmission can be determined according to the following equation.

$$k = k' + 12m + \begin{cases} -0 & \text{for } p \in \{0, 1\}, \text{ normal cyclic prefix} \\ -6 & \text{for } p \in \{2, 3\}, \text{ normal cyclic prefix} \\ -1 & \text{for } p \in \{4, 5\}, \text{ normal cyclic prefix} \\ -7 & \text{for } p \in \{6, 7\}, \text{ normal cyclic prefix} \\ -0 & \text{for } p \in \{0, 1\}, \text{ extended cyclic prefix} \\ -3 & \text{for } p \in \{2, 3\}, \text{ extended cyclic prefix} \\ -6 & \text{for } p \in \{4, 5\}, \text{ extended cyclic prefix} \\ -9 & \text{for } p \in \{6, 7\}, \text{ extended cyclic prefix} \end{cases}$$ [Equation 2]

$$l = l' + \begin{cases} l'' & \text{CSI reference signal configurations } 0-19, \\ & \text{normal cyclic prefix} \\ 2l'' & \text{CSI reference signal configurations } 20-31, \\ & \text{normal cyclic prefix} \\ l'' & \text{CSI reference signal configurations } 0-27, \\ & \text{extended cyclic prefix} \end{cases}$$

-continued $$w_{l''} = \begin{cases} 1 & p \in \{0, 1, 2, 3\} \\ (-1)^{l''} & p \in \{4, 5, 6, 7\} \end{cases}$$

$l'' = 0, 1$ $m = 0, 1, \ldots, N_{RB}^{DL} - 1$ $m' = m + \left\lfloor \frac{N_{RB}^{max,DL} - N_{RB}^{DL}}{2} \right\rfloor$ FIG. 5 illustrates CSI-RS configurations. Particularly, FIG. 5 illustrates CSI-RS configurations according to Equation 1 and Table 3 and shows positions of resources occupied by CSI-RSs in one RB pair in each CSI-RS configuration.

FIG. 5(a) shows 20 CSI-RS configurations available for CSI-RS transmission through 2 CSI-RS ports, FIG. 5(b) shows 10 CSI-RS configurations available for CSI-RS transmission through 4 CSI-RS ports and FIG. 5(c) shows 5 CSI-RS configurations available for CSI-RS transmission through 8 CSI-RS ports. CSI-RS configurations defined on the basis of the number of CSI-RS ports may be numbered.

When a BS sets 2 antenna ports for CSI-RS transmission, that is, sets 2 CSI-RS ports, CSI-RS transmission is performed in a radio resource corresponding to one of the 20 CSI-RS configurations, shown in FIG. 5(a), through the 2 CSI-RS ports. When 4 CSI-RS ports are set for a specific cell, CSI-RSs are transmitted in resources corresponding to CSI-RS configurations for the specific cell from among the 10 CSI-RS configurations, shown in FIG. 5(b), through the 4 CSI-RS ports. When 8 CSI-RS ports are set for the specific cell, CSI-RSs are transmitted in resources corresponding to CSI-RS configurations for the specific cell from among the 5 CSI-RS configurations, shown in FIG. 5(c), through the 8 CSI-RS ports.

CSI-RS configurations have a nested property. The nested property means that a CSI-RS configuration for a large number of CSI-RS ports becomes a super set of a CSI-RS configuration for a small number of CSI-RS ports. Referring to FIGS. 5(b) and 5(c), REs corresponding to CSI-RS configuration 0 with respect to 4 CSI-RS ports are included in resources corresponding to CSI-RS configuration 0 with respect to 8 CSI-RS ports.

A plurality of CSI-RSs may be used in a predetermined cell. In case of a non-zero power CSI-RS, only a CSI-RS with respect to one CSI-RS configuration is transmitted. In case of a zero power CSI-RS, a CSI-RS with respect to a plurality of CSI-RS configurations may be transmitted. A UE assumes zero transmission power for resources other than resources that need to be assumed to correspond to non-zero power CSI-RSs, from among resources corresponding to zero power CSI-RSs. For example, with regard to a radio frame for TDD, a CSI-RS is not transmitted in a special subframe in which downlink transmission and uplink transmission coexist, a subframe in which a paging message is transmitted and a subframe in which transmission of a synchronization signal, a physical broadcast channel (PBCH) or system information block type 1 (SIB1) collide with a CSI-RS, and the UE assumes that a CSI-RS is not transmitted in these subframes. A time-frequency resource used for a CSI-RS port to transmit the corresponding CSI-RS is not used for PDSCH transmission through any antenna port and is not used for CSI-RS transmission through an antenna port other than the corresponding CSI-RS port.

Since time-frequency resources used for CSI-RS transmission cannot be used for data transmission, data throughput decreases as CSI-RS overhead increases. In view of this, a CSI-RS is configured to be transmitted at a predetermined transmission interval corresponding to a plurality of subframes rather than being configured to be transmitted per subframe. In this case, CSI-RS transmission overhead can be remarkably reduced compared to a case in which the CSI-RS is transmitted per subframe. In the following description, a subframe configured for CSI-RS transmission is referred to as a CSI-RS subframe. A subframe configured for CSI-RS transmission may be defined by CSI-RS transmission periodicity and subframe offset. The CSI-RS transmission periodicity and subframe offset are referred to as a CSI-RS subframe configuration. Table 5 shows CSI-RS transmission periodicity $T_{CSI-RS}$ and subframe offset $\Delta_{CSI-RS}$.

TABLE 5

| CSI-RS subframe configuration $I_{CSI-RS}$ | CSI-RS periodicity $T_{CSI-RS}$ (subframes) | CSI-RS subframe offset $\Delta_{CSI-RS}$ (subframes) |
| --- | --- | --- |
| $I_{CSI-RS} \leq 4$ | 5 | $I_{CSI-RS}$ |
| $5 \leq I_{CSI-RS} \leq 14$ | 10 | $I_{CSI-RS} - 5$ |
| $15 \leq I_{CSI-RS} \leq 34$ | 20 | $I_{CSI-RS} - 15$ |
| $35 \leq I_{CSI-RS} \leq 74$ | 40 | $I_{CSI-RS} - 35$ |
| $75 \leq I_{CSI-RS} \leq 154$ | 80 | $I_{CSI-RS} - 75$ |

In Table 5, $I_{CSI-RS}$ specifies CSI-RS transmission periodicity and subframe offset.

The BS may determine or adjust $I_{CSI-RS}$ and transmit $I_{CSI-RS}$ to UEs within the coverage of the corresponding cell. A UE may be aware of a CSI-RS subframe in which a CSI-RS of the cell (referred to as a serving cell, hereinafter) that provides communication services to the UE is transmitted on the basis of $I_{CSI-RS}$. The UE may determine a subframe which satisfies the following equation as a CSI-RS subframe.

$$(10n_f + \lfloor n_s/2 \rfloor - \Delta_{CSI-RS}) \bmod T_{CSI-RS} = 0 \quad \text{[Equation 3]}$$

Here, $n_f$ denotes a system frame number and $n_s$ represents a slot number of a radio frame.

For example, referring to Table 5, when $I_{CSI-RS}$ is greater than 5 and less than 14, a CSI-RS is transmitted every 10 subframes, starting from a subframe corresponding to a subframe number $I_{CSI-RS} - 5$.

The BS may notify the UE of the following parameters through higher layer signaling (e.g. medium access control (MAC) signaling or radio resource control (RRC) signaling).

Number of CSI-RS ports
  CSI-RS configuration (refer to Tables 3 and 4, for example)
  CSI-RS subframe configuration (refer to Table 5, for example)
  CSI-RS subframe configuration periodicity $T_{CSI-RS}$
  CSI-RS subframe offset $\Delta_{CSI-RS}$ The BS may notify the UE of a CSI-RS configuration transmitted with zero power and a subframe configuration for transmission of a zero power CSI-RS as necessary. The CSI-RS configurations of Tables 3 and 4 may be used as the zero power CSI-RS configuration and the CSI-RS subframe configuration of Table 5 may be used as the subframe configuration for transmission of the zero power CSI-RS.

A BS may notify a UE of following parameters via higher layer signaling (for example, MAC (medium access control) signaling, RRC (radio resource control) signaling).

Number of CSI-RS ports
  CSI-RS configuration
  CSI-RS subframe configuration
  CSI-RS subframe configuration periodicity $T_{CSI-RS}$
  CSI-RS subframe offset $\Delta_{CSI-RS}$ If necessary, the BS may notify the UE of CSI-RS configuration transmitted at a zero-power and subframe configuration to which zero-power CSI-RS configuration is transmitted.

The aforementioned parameters are signaled to the UE, whereby the UE may identify that the corresponding CSI-RS is transmitted from the eNB. However, transmission of the CSI-RS is not performed actually under the following restrictions:

in a special subframe where a frame structure type 2 (that is, TDD system) is used;
  in a subframe where CSI-RS transmission may collide with synchronization signals, PBCH, or system information block type 1 (SIB1) messages; and
  in subframes configured for transmission of paging messages in a primary cell for a UE having cell-specific paging configuration.

The UE should measure a plurality of CSI-RSs to support a coordinated multiple transmission and reception (CoMP) or carrier aggregation (CA). Alternatively, even though the UE does not measure the CSI-RS directly, in PDSCH transmitted to the UE, data may be transmitted to some REs of PDSCH scheduled due to transmission of CSI-RS from another cell by rate-matching without mapping. Therefore, for PDSCH demodulation, the UE should know CSI-RS transmission information of another cell that affects PDSCH demodulation.

Generally, special subframes in the TDD system are configured in such a manner that the special subframes are mutually aligned in a cell to which CoMP or CA is applied. Also, since locations of time and frequency resources to which synchronization signals, PBCH, SIB1, etc. are transmitted are fixed, there is no problem. However, subframe and radio frame to which paging messages may be transmitted are determined by a specific equation, and are varied depending on traffic load of each cell, UE-specific value, etc., whereby the UE should know information corresponding to traffic node of each cell, UE-specific value, etc. Therefore, the Pcell should signal paging information of the Scell or another CoMP cell separately from its paging information, or should signal information of a subframe, to which the CSI-RS from the corresponding cell is not transmitted, in accordance with paging and another signaling or the need of a network.

Hereinafter, for CSI-RS measurement in the Pcell and the Scell, a method for providing information as to whether CSI-RS transmission is performed based on paging of the Scell and information on a PDSCH rate matching pattern based on the CSI-RS transmission. Next, parameters related to paging and a paging transmission subframe pattern will be described.

The UE may use a discontinuous reception (DRX) in an idle mode to reduce power consumption. One paging occasion (PO) is a subframe where P-RNTI transmitted through a PDCCH addressing the paging message may exist. One paging frame (PF) is one radio frame that may include one or more paging occasion(s). If DRX is used, the UE needs to monitor one PO every DRX cycle.

The PF and the PO are determined by the following Equations that use DRS parameters included in the system information.

$$PF = SFN \bmod T = (T \text{ div } N)*(UE\_ID \bmod N) \quad \text{[Equation 4]}$$

The following index i_s indicates a PO from a subframe pattern which will be described later.

$$i\_s = \text{floor}(UE\_ID/N) \bmod Ns \quad \text{[Equation 5]}$$

The DRX parameters stored in the UE may be updated within the UE whenever their values are varied in the system information. If the UE does not have IMSI, for example, if the UE makes an emergency call without USIM, the UE should use UE_ID=0 as a default identifier in the aforementioned Equations.

The following parameters are used to use the above Equations.

T: is a DRX cycle of the UE. If T is allocated by upper layers, T is determined by a minimum value of UE-specific DRX value. And, T is a default DRX value broadcasted in the system information. If the UE-specific DRX is not configured by the upper layers, the above default DRX value is used.

nB: 4T, 2T, T, T/2, T/4, T/8, T/16, T/32.

N: min(T,nB)

Ns: max(1,nB/T)

UE_ID: IMSI mod 1024

IMSI is given as a number sequence of a type integer (0 . . . 9), and should be interpreted as a decimal number integer in the above Equations, wherein the first number given in the sequence indicates the highest digit. For example, $$IMSI = 12(\text{digit}=1, \text{digit}=2).$$

In this calculation, IMSI should be interpreted as a decimal number "12", and should not be interpreted as "1*16+2=18".

The following Tables illustrate subframe patterns acquired using the above Equations, and correspond to FDD and TDD, respectively.

TABLE 7

| Ns | PO when i_s = 0 | PO when i_s = 1 | PO when i_s = 2 | PO when i_s = 3 |
| --- | --- | --- | --- | --- |
| 1 | 9 | N/A | N/A | N/A |
| 2 | 4 | 9 | N/A | N/A |
| 4 | 0 | 4 | 5 | 9 |

TABLE 8

| Ns | PO when i_s = 0 | PO when i_s = 1 | PO when i_s = 2 | PO when i_s = 3 |
| --- | --- | --- | --- | --- |
| 1 | 0 | N/A | N/A | N/A |
| 2 | 0 | 5 | N/A | N/A |
| 4 | 0 | 1 | 5 | 6 |

A method for signaling the aforementioned paging related parameters in accordance with one embodiment of the present invention is suggested. A method for signaling the aforementioned paging related parameters by using the existing paging Equations (for example, Equations 1 and 2) is suggested. The network may signal the nB and/or the Ns, and the UE may acquire information on a radio frame and subframe to which paging is transmitted in accordance with the above Equation(s) by using the two parameters. The paging related parameters of the Pcell of the UE may only be signaled to the UE, and the UE may determine whether the CSI-RS has been transmitted and a PDSCH rate-matching pattern based on the CSI-RS transmission.

The basic operation in reception of the paging related parameters is as follows. The UE that has received the paging related parameters may infer a radio frame and subframe to which the paging message may be transmitted by using the above parameters and then consider that the actual paging message will be transmitted at a location of the corresponding subframe, and UEs which are in a DRX mode of an idle state should also monitor the PDCCH at the corresponding subframe.

Generally, since the UE does not need to receive the paging related parameters of the Scell, the paging related parameters of the Scell are not signaled to the UE. However, when the UE intends to perform CSI-RS measurement of the Scell, the CSI-RS of the Scell may not be transmitted at a special subframe due to paging transmission of the Scell. If the UE does not know this information, channel estimation becomes incorrect, and a problem occurs in reception and demodulation of the PDSCH. Therefore, in order to notify the UE whether the CSI-RS of the Scell has been transmitted, the Pcell may signal a cell-specific paging related parameter of the Scell to the UE.

However, in signaling the paging related parameter (hereinafter, referred to as "paging information") of the Scell to the UE, information as to whether the CSI-RS of the Scell has been transmitted and PDSCH mapping information at a subframe to which the paging message of the Scell is transmitted may be notified to the UE but the Pcell may have a load in signaling updated paging information of the Scell to its serving UE whenever paging information of the Scell is updated. Considering that the CSI-RS is transmitted at a cycle of minimum 5 ms, it may not be required to notify the UE of paging information on granularity smaller than a CSI-RS transmission cycle for the purpose of signaling the subframe to which the CSI-RS is not transmitted. That is, this signaling is not intended to notify whether paging of the Scell is transmitted but intended to notify whether the CSI-RS that affects PDSCH demodulation is transmitted from the Scell. Therefore, in order to avoid signaling overhead and unnecessary signaling, there is suggested a method for signaling a subframe to which the CSI-RS of the Scell is not transmitted by using a paging related equation to notify whether the CSI-RS of the Scell has been transmitted. Simply, this information may be a basic parameter nB' indicating cell-specific paging information, and may be transferred to the UE through dedicated RRC signaling to notify the UE whether the CSI-RS is effective (that is, whether the CSI-RS is transmitted at the corresponding subframe). This parameter value may be a value different from a value indicating actual paging information (hereinafter, referred to as "$nB_{SC}$" to be identified from "nB") of the Scell. That is, the parameter value may be a value different from the paging parameter $nB_{SC}$ transmitted from the Scell to its serving UE in radio resource configuration common RadioResourceConfigCommon of SIB2.

Also, in order to determine whether the CSI-RS of the Scell is effective, that is, for the purpose of acquiring paging information of the Scell, the UE may receive broadcast information of its Scell. In particular, it is assumed that the corresponding UE receives cell-specific paging information $nB_{SC}$ transmitted from radio resource configuration common RadioResourceConfigCommon of SIB2 of the Scell. However, when the Pcell transfers the paging related parameter nB' of the Scell to the corresponding UE through dedicated RRC signaling to determine whether the CSI-RS of the Scell is effective, that is, for the purpose of acquiring paging information of the Scell, the value $nB_{SC}$ and the value nB' may be different from each other. In this case, the UE uses the value nB' signaled thereto through dedicated RRC signaling to receive and measure the CSI-RS of the Scell, especially to determine a subframe where CSI-RS measurement is not effective. That is, although PO and PF of the Scell are actually acquired using the value $nB_{SC}$ and the above Equation(s) and Table(s), the above information is not used to allow the UE taking the corresponding cell as the Scell to determine whether the CSI-RS transmitted from the Scell is effective. Instead, although may be different from actual paging transmission of the Scell, the value nB' separately signaled to the UE and a subframe pattern based on the value nB' are used to determine whether the CSI-RS is effective. Although the value nB' signaled to determine whether the CSI-RS transmission is effective may correspond to the same range of the paging related parameter nB, the value nB' may preferably be selected within the range of {T/2, T/4, T/8, T/16, T/32}.

The value nB means a value indicating how many cell-specific paging occasions (POs) exist for a DRX cycle T of the UE. If the value nB has a value of nB={4T, 2T, T}, it means that PO of four subframes 4T, two subframes 2T and one subframe 1T exists per radio frame. In this case, since it is preferable that the network configures the CSI-RS to avoid PO existing per radio frame, it is not required to signal this value to the UE to determine whether the CSI-RS is effective.

In accordance with one embodiment of the present invention, the paging related parameter nB' of the special cell may be configured as a value different from the actual paging related parameter $nB_{SC}$ of the special cell and then signaled to the UE. A detailed example of the paging related parameter will be described in accordance with a size relation between the value nB' and the value $nB_{SC}$.

In case of nBSC=<nB'

Supposing that the paging message is transmitted more frequently than the actual PO of the Scell, the UE may be notified that CSI-RS transmission at special subframes is not effective. Generally, the network may control the value nB in accordance with load of the paging message. For the UE that does not receive the paging message of the Scell in fact, it is not required to signal the paging information of the Scell to the UE whenever the value nB is actually updated. Therefore, considering that the Scell transmits the paging message most frequently, the value nB' is signaled to the UE. It may mean that the CSI-RS is not transmitted at the corresponding frames even though the paging message of the Scell is not transmitted to the corresponding subframes actually, or may indicate that the CSI-RS at the corresponding subframe is not effective. As a result, the network has degree of freedom, which may not cause any problem in UE operation, without updating the paging information of the Scell to the UE every time.

In case of nBSC≥nB'

Contrary to the aforementioned case, supposing that the paging message is transmitted less frequently than the actual PO of the Scell, the UE may be notified that CSI-RS transmission from special subframes is not effective. This example may be used when a hot-spot area exists within coverage of the macro eNB. For example, relatively more UEs may be located within coverage of a special pico eNB while relatively less UEs may be located within coverage of some micro eNBs, whereby the number of UEs of an idle mode within coverage of the pico eNB may be different from the number of UEs of an idle mode within coverage of the macro eNB. Generally, the eNBs existing within a corresponding area reserve the same amount of paging resources in a paging area and use the paging resources to transmit the paging message. However, if UEs are concentrated on coverage of a special pico eNB, the macro eNBs adjacent to the pico eNB also reserve paging resources as much as the paging resources of the pico eNB. In this case, even though the macro cells transmit the paging message, a small number of UEs will respond to the corresponding paging message, whereby resource waste may be caused due to the excessive paging resources.

Therefore, even in case of a subframe reserved for the PO, if the network does not transmit the paging message at the subframe, the network should notify the UE of such information indicating that the paging message is not transmitted and allow CSI-RS transmission to be performed at the subframe, whereby resource waste may be avoided. For example, the Pcell (pico eNB) may signal the value nB' ($<nB_{SC}$) as the value smaller than the actual PO of the Scell (macro eNB) when the UE that regards the pico eNB as the Pcell and regards the macro eNB as the Scell may determine effectiveness of CSI-RS transmission from the Scell. In this case, the paging message of the Scell may be transmitted at other subframe other than the subframe determined by the value nB' received by the UE, and CSI-RS transmission from the Scell cannot be performed at the other subframe. However, in even case, the corresponding UE assumes that the CSI-RS is transmitted from the Scell.

The UE that has received the parameter nB' may identify a special radio frame and subframe of the Scell, which are indicated by the Pcell, by using the aforementioned paging related Equation(s). The UE does not measure the CSI-RS at the corresponding subframe on the assumption that the CSI-RS of the Scell is not transmitted at the corresponding subframe. When the PDSCH is received at the corresponding subframe, the UE performs PDSCH demodulation without performing rate-matching for the corresponding CSI-RS by assuming that data mapping is performed in the location of the CSI-RS of the corresponding Scell. In another way, the UE performs rate-matching for the CSI-RS location of the Scell at the corresponding subframe but may determine that the corresponding subframe is not suitable for CSI-RS measurement.

In the present invention, the serving cell and the Scell in CoMP operation of the Pcell may be interpreted as other TPs not the serving cells of CoMP cells that perform mutual cooperation in CoMP operation. In this case, to indicate CSI-RS transmission of other cell other than the serving cell and PDSCH mapping, the UE may signal whether CSI-RS of the other cell is effective, by using the paging related Equation(s), and UE operation according to the signaling is the same as that for acquiring information as to whether the CSI-RS of the Scell is effective, through the paging related parameter.

Figure 6:
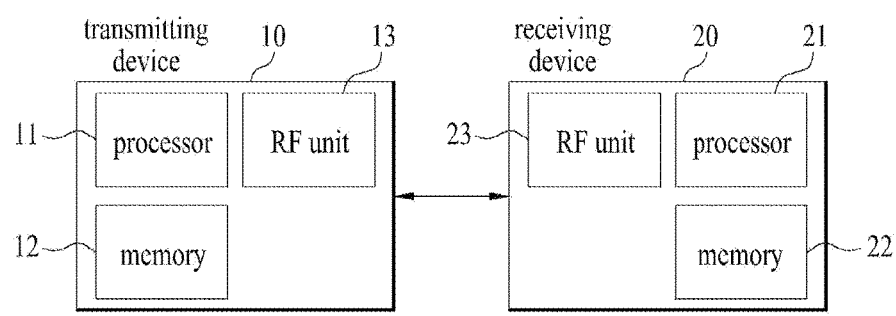
FIG. 6 is a block diagram illustrating a device for implementing the embodiment(s) of the present invention.

FIG. 6 is a block diagram of a transmitting device 10 and a receiving device 20 configured to implement exemplary embodiments of the present invention. Referring to FIG. 6, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, a BS serves as the receiving device 20 on uplink and as the transmission device 10 on downlink.

Specific configurations of the UE or the BS functioning as the transmitting device and/or the receiving device may be implemented as a combination of one or more embodiments of the present invention described above in connection with the figures.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention is applicable to a terminal, a base station (BS), or other devices in wireless communication system.

The invention claimed is:
1. A method for receiving downlink data in a wireless communication system, the method comprising:

receiving, by a terminal from a first cell, and scheduled by the first cell, a first parameter (nB') of a second cell for determining validity of a channel state information-reference signal (CSI-RS) which is transmitted from the second cell; and acquiring, by the terminal, information on a subframe in which the CSI-RS is determined to be not valid by using the first parameter, and demodulating the downlink data from the second cell based on the acquired information on the subframe, wherein the first parameter is different from a second parameter ($nB_{sc}$) of the second cell, transmitted by the second cell to serving terminals of the second cell, indicating the number of subframes in which a paging message of the second cell is transmitted for a reference time, and wherein the first parameter is smaller than the second parameter when there are fewer terminals covered by the second cell, which are not also covered by the first cell, than terminals covered by the first cell.

2. The method according to claim 1, wherein the paging message of the second cell includes a paging message of a secondary cell (Scell) or non-serving cell.

3. The method according to claim 1, wherein the reference time corresponds to a discontinuous reception (DRX) cycle.

4. The method according to claim 1, wherein the downlink data is demodulated on an assumption that the downlink data is mapped into a resource location of a channel state information-reference signal of the second cell in the subframe.

5. The method according to claim 1, wherein the subframe in which the paging message is transmitted is determined to be a subframe in which the CSI-RS is not valid.

6. A method for transmitting downlink data in a wireless communication system, the method performed by a first cell and comprising:

transmitting, to a user equipment, a first parameter (nB') of a second cell for determining validity of a channel state information-reference signal (CSI-RS) which is transmitted from the second cell, wherein the first parameter enables the user equipment to acquire information on a subframe in which the CSI-RS is not valid, wherein the first parameter is different from a second parameter ($nB_{sc}$) of the second cell, transmitted by the second cell to serving terminals of the second cell, indicating the number of subframes in which a paging message of the second cell is transmitted for a reference time, and wherein the first parameter is smaller than the second parameter when there are fewer terminals covered by the second cell, which are not also covered by the first cell, than terminals covered by the first cell.

7. The method according to claim 6, wherein the paging message of the second cell includes a paging message of a secondary cell (Scell) or non-serving cell.

8. The method according to claim 6, wherein the reference time corresponds to a discontinuous reception (DRX) cycle.

9. The method according to claim 6, further comprising:
demodulating the downlink data assuming that the downlink data is mapped into a resource location of a channel state information-reference signal of the second cell in the subframe.

10. The method according to claim 6, wherein the subframe in which the paging message is transmitted is determined to be a subframe in which the CSI-RS is not valid.

11. A user equipment configured to receive downlink data in a wireless communication system, the user equipment comprising:

a receiver and a transmitter; and
a processor that:
controls the receiver to receive, from a first cell, a first parameter (nB') of a second cell used for determining validity of a channel state information-reference signal (CSI-RS) which is transmitted from the second cell, acquires information on a subframe in which the CSI-RS is determined not to be valid by using the first parameter, and demodulates the downlink data based on the acquired information on the subframe, wherein the first parameter is different from a second parameter ($nB_{sc}$) of the second cell, transmitted by the second cell to serving terminals of the second cell, indicating the number of subframes in which a paging message of the second cell is transmitted for a reference time, and wherein the first parameter is smaller than the second parameter when there are fewer terminals covered by the second cell, which are not also covered by the first cell, than terminals covered by the first cell.

12. A base station configured to transmit downlink data in a wireless communication system, the base station comprising:

a receiver and a transmitter; and
a processor that:
controls the transmitter to transmit, to a user equipment, a first parameter (nB') of a second base station for determining validity of a channel state information-reference signal (CSI-RS) which is transmitted from the second base station, wherein the first parameter enables the user equipment to acquire information on a subframe in which the CSI-RS is determined not to be valid based by using the first parameter, wherein the first parameter is different from a second parameter ($nB_{sc}$) of the second base station, transmitted by the second base station to serving terminals of the second cell, indicating the number of subframes in which the paging message of the second base station is transmitted for the reference time, and wherein the first parameter is smaller than the second parameter when there are fewer terminals covered by the second cell, which are not also covered by the first cell, than terminals covered by the first cell.

* * * * *